(12) United States Patent
Mueller et al.

(10) Patent No.: US 9,933,077 B2
(45) Date of Patent: Apr. 3, 2018

(54) CARTRIDGE VALVE

(71) Applicant: Hilite Germany GmbH, Marktheidenfeld (DE)

(72) Inventors: Falk Mueller, Wuerzburg (DE); Thorsten Fischer, Obermoos (DE)

(73) Assignee: Hilite Germany GmbH, Marktheldenfeld (DE)

( * ) Notice: Subject to any disclaimer, the term of this patent is extended or adjusted under 35 U.S.C. 154(b) by 198 days.

(21) Appl. No.: 14/827,481

(22) Filed: Aug. 17, 2015

(65) Prior Publication Data

US 2016/0102755 A1 Apr. 14, 2016

(30) Foreign Application Priority Data

Oct. 14, 2014 (DE) .................. 10 2014 114 880

(51) Int. Cl.
*F16K 11/07* (2006.01)
*B01D 29/00* (2006.01)
*B01D 35/00* (2006.01)
*F16K 31/06* (2006.01)
(Continued)

(52) U.S. Cl.
CPC ............ *F16K 11/07* (2013.01); *B01D 35/005* (2013.01); *F16K 31/0613* (2013.01); *B01D 29/0036* (2013.01); *B01D 2201/0415* (2013.01); *B01D 2201/0423* (2013.01); *F16H 61/0276* (2013.01); *F16K 25/005* (2013.01)

(58) Field of Classification Search
CPC .. B01D 29/0036; B01D 29/01; B01D 35/005; B01D 35/02; B01D 35/157; B01D 2201/04; B01D 2201/0415; B01D 2201/0423; F16H 61/0276; F16H 2061/0279; F16K 11/07; F16K 27/04; F16K 27/041; F16K 27/048; Y10T 137/794; Y10T 137/7976; Y10T 137/8122; Y10T 167/86702
USPC ................................. 210/429–432, 455, 499
See application file for complete search history.

(56) References Cited

U.S. PATENT DOCUMENTS 1,534,129 A * 4/1925 Marden .................. B01D 35/02
                                                210/300
5,247,965 A    9/1993 Oka et al.
(Continued)

FOREIGN PATENT DOCUMENTS

DE          19510647 C1       2/1996
DE       102011002150       * 10/2012   .......... F16K 11/0712
DE       102011002150  A1    10/2012

*Primary Examiner* — Mary McManmon
*Assistant Examiner* — Richard K Durden
(74) *Attorney, Agent, or Firm* — Von Rohrscheidt Patents

(57) ABSTRACT

A cartridge valve including a hydraulic bushing including at least one connection which is configured as a slotted hole extending over a defined portion of a circumference of the hydraulic bushing with respect to a longitudinal axis of the hydraulic bushing and which is protected by a screen insert inserted into the slotted hole. According to the invention the slotted hole includes a receiving groove that is configured at least over a portion of a circumference of the slotted hole, and the screen insert is arrangeable so that its outer edge is at least partially supported between a shoulder configured in the receiving groove and a cover tongue of the receiving groove wherein the cover tongue is arranged opposite to the shoulder.

14 Claims, 8 Drawing Sheets

(51) Int. Cl.
*F16H 61/02* (2006.01)
*F16K 25/00* (2006.01)

(56) References Cited

U.S. PATENT DOCUMENTS

| | | | | |
|---|---|---|---|---|
| 6,892,759 | B2* | 5/2005 | Cornea | B01D 35/04 137/544 |
| 7,000,633 | B2* | 2/2006 | Okada | F01M 11/03 137/549 |
| 7,905,248 | B2* | 3/2011 | Yoshida | F16K 31/0613 137/550 |
| 8,127,790 | B2* | 3/2012 | Van Weelden | F15B 13/0402 137/550 |
| 8,186,378 | B2* | 5/2012 | Nordstrom | F16K 31/0613 137/550 |
| 2008/0230452 | A1* | 9/2008 | Fujii | F16K 31/0613 210/130 |
| 2011/0226204 | A1* | 9/2011 | Hoppe | B01D 29/014 123/90.17 |
| 2013/0048112 | A1* | 2/2013 | Nemoto | F16K 31/0613 137/544 |
| 2013/0061959 | A1* | 3/2013 | Stephens | F01L 1/344 137/544 |
| 2015/0083243 | A1* | 3/2015 | Yoshida | B01D 35/02 137/544 |

* cited by examiner

CARTRIDGE VALVE

RELATED APPLICATIONS

This application claims priority from and incorporates by reference German patent application DE 10 2014 114 880.0 filed on Oct. 14, 2014.

FIELD OF THE INVENTION

The invention relates to a cartridge valve.

BACKGROUND OF THE INVENTION

A cartridge valve for an automatic transmission is known from U.S. Pat. No. 5,247,965 which includes a hydraulic bushings which includes plural connection openings which are provided as slotted holes that have a limited circumferential extension. In order to prevent contaminant particles from jamming the cartridge valve a recess portion is provided in the hydraulic bushing where contaminant particles like steel powder sink due to their weight. The cartridge valve is suitable for position oriented installation since the slotted holes do not completely envelop the circumference of the hydraulic bushing so that bore holes in a housing receiving the cartridge valve can start directly from the slotted hole.

Another cartridge valve is known from the German patent document DE 195 10 647 C1. This cartridge valve includes two supply connections P, an operating connection A and a tank connection T. Respective inserts are inserted into the supply connections P and the operating connection A.

The patent document DE 2011 002 150 A1 already shows a cartridge valve that includes a hydraulic bushing which includes the three connections P, A, B. These three connections are configured as slotted holes which extend with reference to a longitudinal axis of the hydraulic bushing within limits within a circumferential direction. Screens are inserted into the slotted holes. The screens are thus either fixated in the slotted hole using hook shaped support elements that are configured at the screen insert or they include a support band through which they are attached at the hydraulic bushing.

BRIEF SUMMARY OF THE INVENTION

It is an object of the invention to provide an alternatively configured axially short cartridge valve which is protected against contaminate particles. This object is achieved according to the invention through the features of patent claim 1.

The cartridge valve according to the invention is characterized in that a slotted hole of the hydraulic bushing includes a receiving groove that is configured at least over a portion of a circumference of the slotted hole wherein a screen insert of the cartridge valve is arrangeable with its outer edge at least partially between a shoulder that is configured in the receiving groove and a cover tongue of the receiving groove that is arranged opposite to the shoulder. Thus, the screen insert is clampable between the shoulder and the cover tongue. Put differently the slotted hole has an undercut into which the screen insert is inserted. The advantage is a simple installation of the screen insert in the hydraulic bushing.

Advantageously the receiving groove is configured in particular as a T-groove in the portion of circumferential ends of the slotted hole. Thus, the sickle shaped insert can be slightly compressed at its longitudinal ends during assembly, put differently it is elastically compressible so that the two ends after being positioned in the slotted hole are arranged between the shoulder and the cover tongue after the applied tension has been released. The T-groove can be introduced into the hydraulic bushing using a so called T-groove cutter.

In an advantageous embodiment the screen insert includes a frame and a thin screen that is received in the frame. It is advantageous that the frame is generally made from a metal material or from a plastic material and can be loaded with push and pull forces since it is configured stronger than the screen which is supported under tension within the frame so that it filters a hydraulic fluid.

In order to prevent damaging the screen in the slotted hole the frame is fixated in the slotted hole. The advantage is that the screen is freely moveable in radial direction in the slotted hole when the screen is loaded by the hydraulic fluid so that the screen is not subjected to damages and crack formation due to alternating loads caused by a change of the flow direction and/or the mass induced force of the hydraulic fluid which would cause chafing at edges of the slotted hole. This leads to an improved service life of the cartridge valve according to the invention. Put differently the frame of the screen is fixated in the slotted hole in order to reduce damages to the screen.

Advantageously a respective support tongue is configured at frame ends that are positionable oriented towards circumferential ends of the slotted holes. This leads to improved handling of the screen insert and to improved protection of the screen against damages.

In another advantageous embodiment a shoulder is provided in the slotted hole at longitudinal sides of the slotted hole wherein the screen insert is placed onto the shoulder. This prevents bending of the screen insert during operation of the cartridge valve and thus reduces the risk that the screen insert develops tears and/or fractures so that the service life of the cartridge valve is further improved.

The shoulder of the receiving groove transitions into the shoulder of the longitudinal sides, wherein the shoulder in the slotted hole is circumferentially closed. This is easily producible using a milling process.

The frame is advantageously configured as an injection molded plastic component which is injection molded around the screen at its circumferential edge. Thus, a simple configuration for the screen insert can be advantageously implemented due to a simple circumferential moulding contour of the screen.

In another embodiment of the cartridge valve according to the invention at least one position support bar extends from the frame in a radially outward direction in order to secure an axial positioning of the screen insert in the hydraulic bushing and is used as a positioning aide during assembly.

For further secure fixation of the screen insert in the slotted hole at least one clamping lug is configured at the frame wherein the clamping lug extends parallel to the longitudinal axis from the frame. In order to receive the clamping lug in the slotted hole the respective receiving groove is configured at longitudinal sides of the slotted hole. The clamping lug can thus be configured in its entirety along the longitudinal axis of the frame which is configured complementary to the longitudinal axis of the slotted hole. However, it suffices for safely supporting the screen insert to provide clamping lugs in sections at the longitudinal axis of the frame.

In a particularly advantageous manner, thus the hydraulic bushing of the cartridge valve can be installed position oriented in a receiving housing. This facilitates a configuration which is very short in an axial direction when plural slotted holes that are sequentially arranged in axial sequence with respect to a longitudinal axis of the hydraulic bushing over the circumference with an offset from each other.

BRIEF DESCRIPTION OF THE DRAWINGS

Further advantages of the invention can be derived from the subsequent description of advantageous embodiments and from the drawing figure. The feature and feature combinations recited in the description and the feature and feature combinations subsequently recited in the figure description and/or in the figures by themselves are not only useable in the respectively stated combination but also in other combinations or by themselves without departing from the scope and spirit of the invention. Identical or functionally equivalent elements are associated with identical reference numerals. For reasons of clarity not all elements may be provided with their reference numerals in all figures without losing the respective association, wherein.

DETAILED DESCRIPTION OF THE INVENTION

Figure 1:
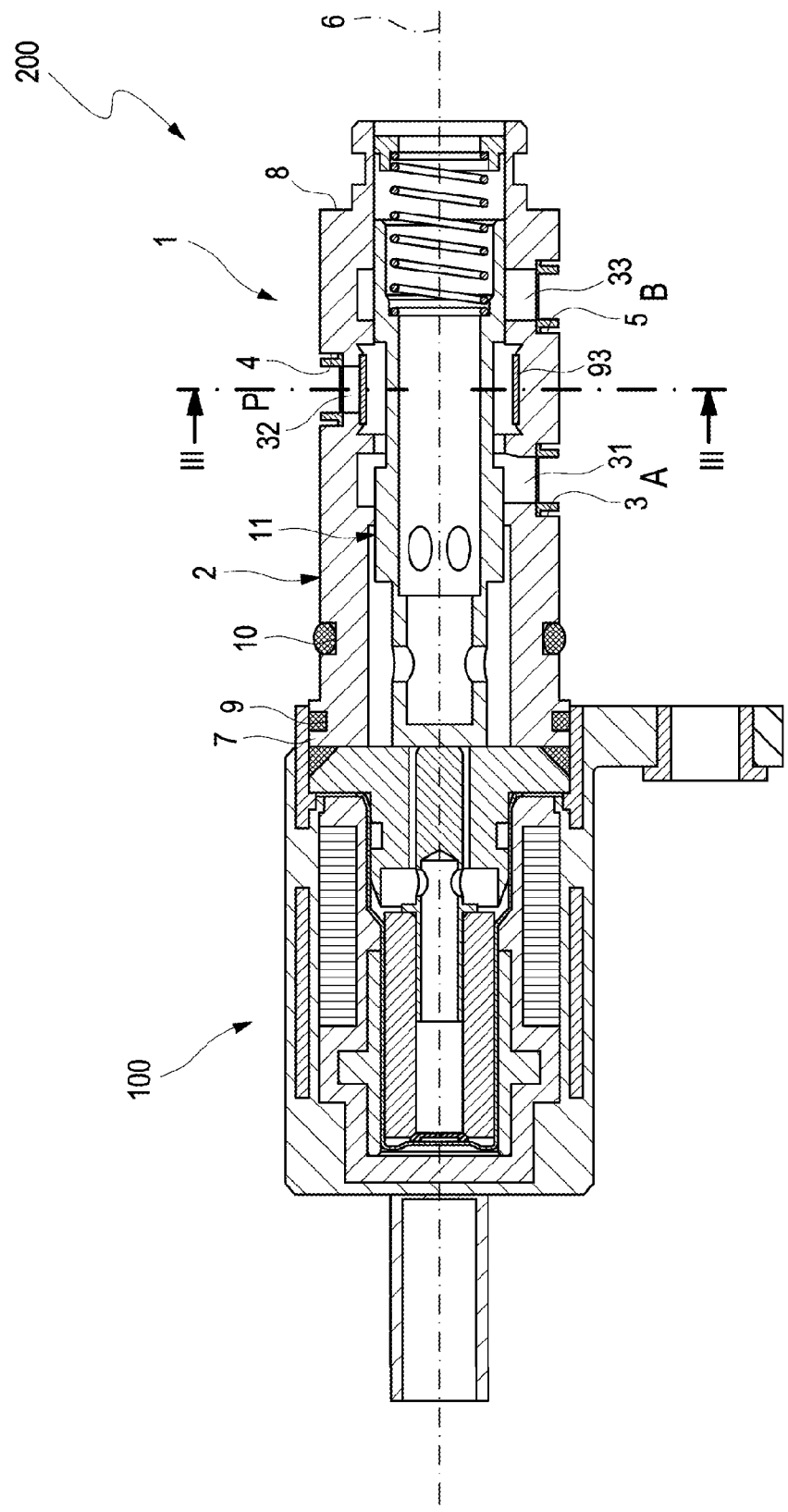
FIG. 1 illustrates a sectional view of an electromagnetic hydraulic valve with a hydraulic bushing.

FIG. 1 illustrates an electromagnetic cartridge valve 200 with a hydraulic element 1. The hydraulic element 1 includes a hydraulic bushing 2 with circumferentially oriented slotted holes, a first slotted hole 3, a second slotted hole 4 and a third slotted hole 5. The three slotted holes 3, 4, 5 are arranged in an axial sequence with respect to a longitudinal axis 6 of the hydraulic bushing 2. The hydraulic bushing 2 thus includes an annular shoulder 7 at its end that is proximal to an electromagnetic actuator 100, wherein the annular shoulder extends in a radially outward direction. A diameter of the hydraulic bushing 2 is reduced by a housing shoulder 8 at the other end of the hydraulic bushing 2. The first end includes a circumferential annular groove 9 at the annular shoulder 7. Another circumferential annular groove 10 is provided between this annular shoulder 7 and the slotted holes 3, 4, 5 wherein an O-ring is inserted into the additional annular groove 10 and seals the connections in outward direction relative to a housing that is not illustrated in more detail.

One connection is a supply connection P which is axially centrally arranged with respect to the longitudinal axis 6 between two operating connections A, B. These two operating connections A, B are arranged with respect to the longitudinal axis 6 on a side of the hydraulic bushing 2 which is arranged opposite to the supply connection P.

The supply connection P is used for supplying the hydraulic element 1 with a hydraulic fluid. The two operating connections A, B are hydraulically connectable with cavities of a hydraulically controlled device, for example with a cam phaser. According to a positioning of a piston 11 that is received axially moveable in the hydraulic bushing 2 the operating connections A, B are either blocked or completely or partially released wherein channels configured in the hydraulic bushing 2 that are associated with the slotted holes 3, 4, 5, a first channel 31 associated with the first slotted hole 3, a second channel 32 associated with the second slotted hole 4 and a third channel 33 associated with the third slotted hole 5 are blocked completely or partially released by the piston 11 to be loaded with the hydraulic fluid.

Figure 2:
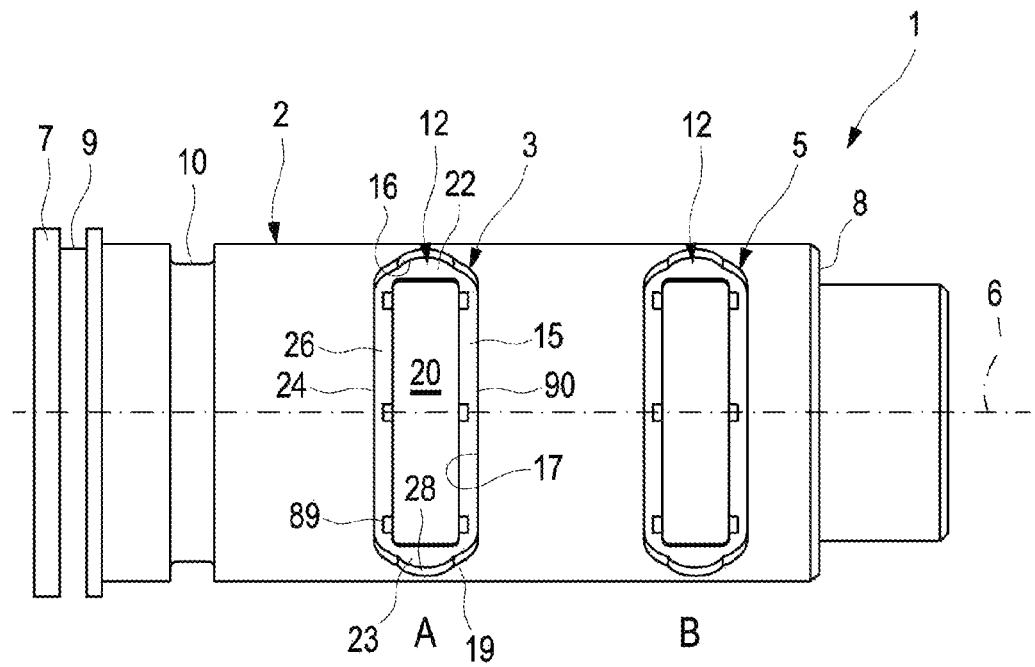
FIG. 2 illustrates a hydraulic bushing with a view of two operating connections respectively including a screen insert of an electromagnetic hydraulic valve in a first embodiment.

FIG. 2 illustrates the hydraulic bushing 2 in a view of the two operating connections A, B. In the first slotted hole 3 and in the third slotted hole 5 a respective screen insert 12 is arranged that is identical with the screen insert 12 of the second slotted hole 4. Since the screen inserts 12 of the three slotted holes 3, 4, 5 and the three slotted holes 3, 4, 5 are identical only one screen insert and only one slotted hole is subsequently described in detail.

Figure 3:
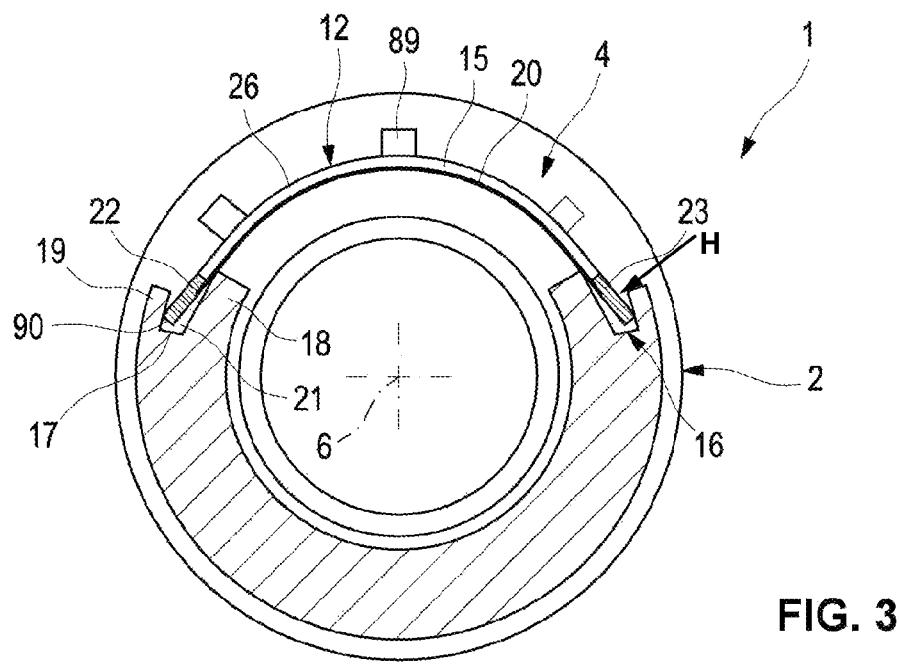
FIG. 3 illustrates a sectional view along the sectional line II-III of the hydraulic bushing of the hydraulic valve according to FIG. 2.

FIG. 3 illustrates the hydraulic bushing 2 along the sectional line III-III as drawn in FIG. 1. Thus, the section line runs through the screen insert 12 which is inserted into the second slotted hole 4 of the supply connection P. In the same manner the screen inserts 12 are inserted into the slotted holes 3, 5 of the two operating connections A, B.

The screen insert 12 includes a closed circumferential frame 15 made from plastic material. The frame 15 has a basic geometry which includes rectangular rounded corner edges wherein the basic geometry is cambered according to a radius in the portion of the slotted hole 4 of the hydraulic bushing 2 due to the sleeve shape of the hydraulic bushing 2. The frame 15 is bent only after an insertion of the screen insert 12 into the hydraulic bushing 2 or even during production of the frame 15 as required by the material that is selected for the frame.

In order to arrange the screen insert 12 in the slotted hole 4 so it cannot be lost the slotted hole 4 includes a receiving groove 16 in which the frame 15 is received. The frame 15 is inserted into the receiving groove 16 and contacts the outer edge of the slotted hole 4 on one side and on the other side it is arranged between a shoulder 18 of the slotted hole 4 or the receiving groove 16 and is supported in particular on an outer edge 90 of the frame 15 at a cover tongue 19 of the receiving groove 16 wherein the cover tongue 19 is arranged radially opposite to the shoulder 18.

In the instant first embodiment the receiving groove 16 is only configured in the portion of the arcuate ends of the slotted hole 4. The receiving groove can also be configured over an entire circumference of the second slotted hole 4, thus also at the longitudinal sides 24 of the slotted hole 4.

A thin screen 20 is arranged within the frame 15 wherein the thin screen 20 was inserted into the mold during the injection molding process of the frame 15. In this embodiment the screen 20 is configured as a screen fabric. Alternatively the screen 20 can also be configured as an etched or stamped thin piece of sheet metal as described infra.

The screen 20 is encased by the plastic material of the frame 15 through injection molding at a circumferential edge 25 of the screen 20. At both ends of the respective screen insert 12 support tongues, a first support tongue 22, and a second support tongue 23 are provided which are arranged between the shoulder 18 and the cover tongue 19.

Figure 4:
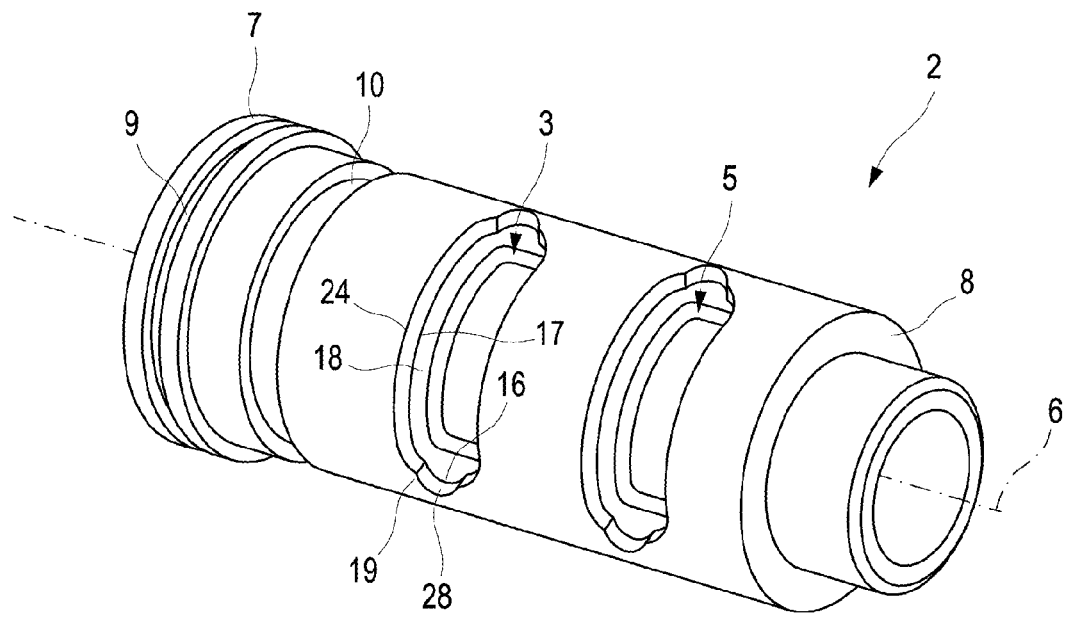
FIG. 4 illustrates a perspective view of the hydraulic bushing of the hydraulic valve according to FIG. 2 without the screen insert.

FIG. 4 illustrates a perspective view of the hydraulic bushing 2 of the first embodiment without screen insert 12. The ends of the slotted hole 4 in which the support tongues 22, 23 are arranged respectively include recesses 28 which are used for positioning the screen insert 12 in the assembly of the cartridge valve 200.

Figure 5:
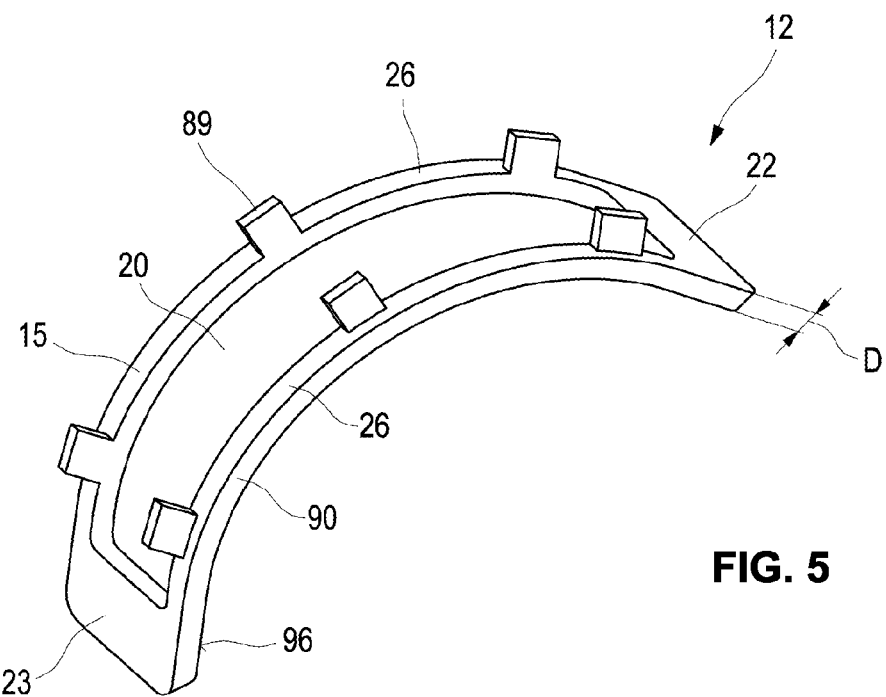
FIG. 5 illustrates a perspective view of the screen insert of the hydraulic valve according to FIG. 2.

FIG. 5 illustrates the screen insert 12 according to the first embodiment in a perspective view. Position support bars 89 are configured at the circumference of the frame 15. The position support bars 89 are arranged in uniform intervals at the longitudinal sides of the frame 15 or at the longitudinal frame sides 26 and are used for axially positioning the screen insert 12 during operations of the cartridge valve 200 and have a simple rectangular cross section. The positioning bars 89 are oriented away from the piston 11 in the hydraulic bushing 2 and are thus positioned oriented towards the respective connection.

Figure 6:
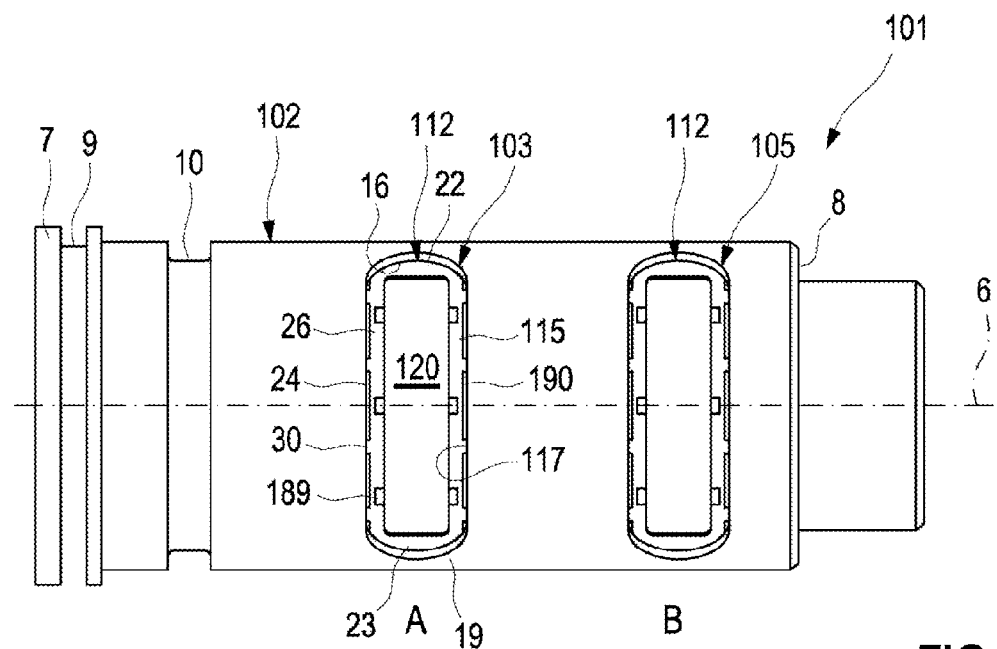
FIG. 6 illustrates the hydraulic bushing of an electromagnetic hydraulic valve in a second embodiment.
Figure 7:
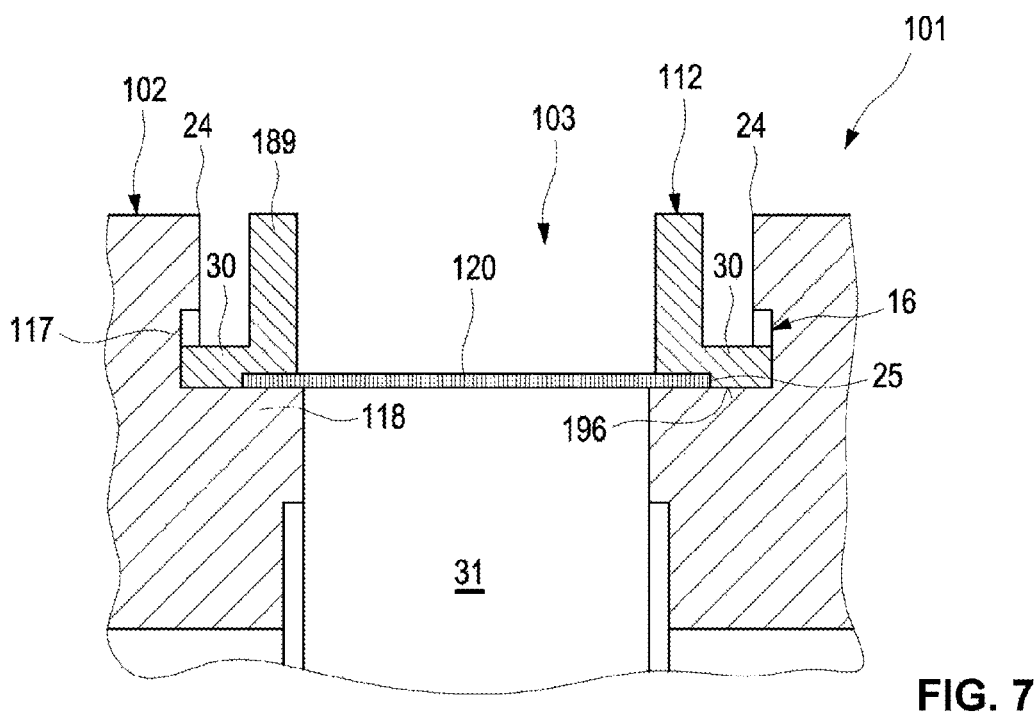
FIG. 7 illustrates a longitudinal sectional view of a detail of the hydraulic bushing in the portion of the screen insert of the hydraulic valve according to FIG. 6.

FIG. 6 illustrates a hydraulic element 101 according to a second embodiment of the cartridge valve 200. This hydraulic element 101 differs primarily through the embodiment of the three screen inserts 112 from the hydraulic element 1 wherein only the screen insert 112 or the slotted hole 103 of the operating connection A is subsequently described since the three screen inserts 112 or the slotted holes 103, 104, 105 are configured identical. The screen insert 112 includes a screen 120 which is mounted in a frame 115 that is made from metal.

The screen 120 is configured in this case again as a screen fabric but it can also be advantageously provided as an etched or stamped piece of sheet metal as described infra. During the mounting process of the cartridge valve 200 the screen insert 112 is pre-bent, inserted into the respective slotted hole, herein the first slotted hole 103 of the hydraulic bushing 102 wherein the support tongues 22, 23 are inserted into a gap 21 that is formed between the shoulder 118 and the cover tongue 19.

The frame 115 includes the position support bars 189 at its longitudinal frame sides 26 and also includes clamping lugs 30 that are axially offset relative to the position supports bars 189, wherein the clamping lugs 30 are arranged at an outer edge 190 of the frame 115. The clamping lugs 30 do not completely extend over the circumference of the screen insert 112 with respect to their longitudinal extension L1, but they only extend over sections of the circumference which suffices for fixation and thus for supporting the screen insert 112 in the hydraulic bushing 102.

The first slotted hole 103 includes the receiving groove 16 not only in the portion of its ends for clamping the first support tongue 22, and the second support tongue 23 but also along its longitudinal sides 24. The screen insert 112 is arranged so that a bottom surface 196 of the frame 115 rests on the shoulder 118 and so that an outer edge 190 is clamped in the receiving groove 16 wherein a form locking connection is provided between the frame 115 and the receiving groove 16. Put differently the frame 115 is clamped at an outer edge 190 of the screen insert 112 in this embodiment. The shoulder 118 in a portion of its longitudinal side 24 does not have to conform with respect to its dimension with the shoulder 118 in the portion of the ends of the first slotted hole 103.

Figure 8:
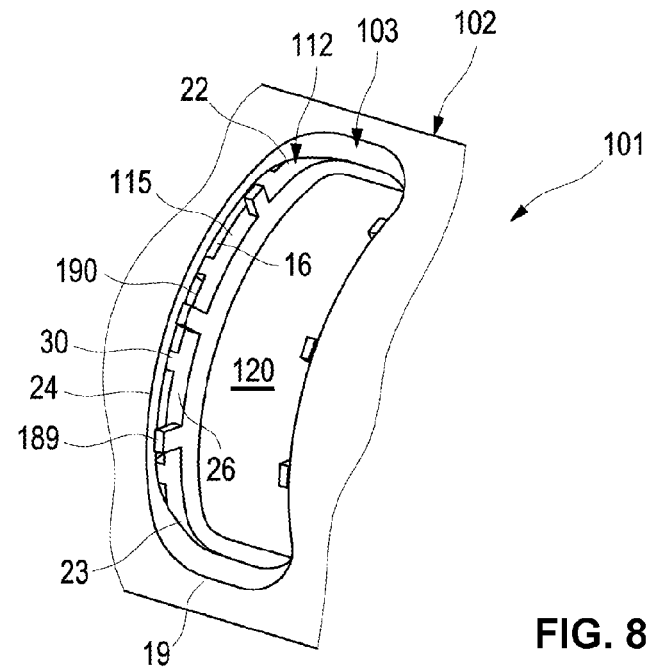
FIG. 8 illustrates a detail view of the screen insert of the hydraulic bushing of the hydraulic valve according to FIG. 6.
Figure 10:
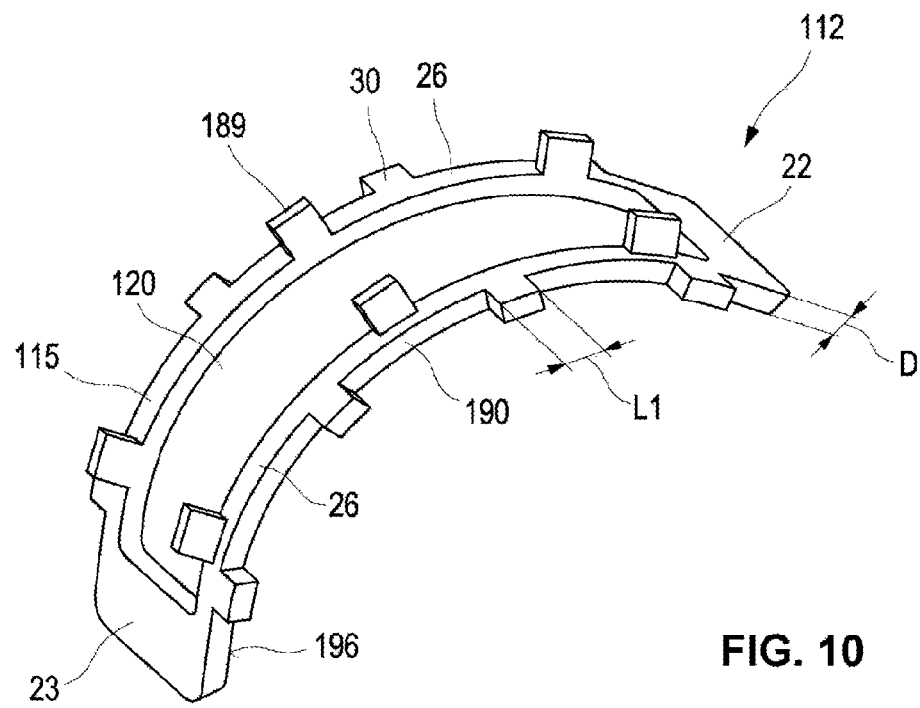
FIG. 10 illustrates a perspective view of the screen insert of the hydraulic valve according to FIG. 6.

FIG. 8 illustrates a detail of the hydraulic element 101 in the portion of the first slotted hole 103 showing in detail a view of the first screen insert 112 in the first slotted hole 103, wherein the screen insert 112 is illustrated in a perspective view in FIG. 10.

Figure 9:
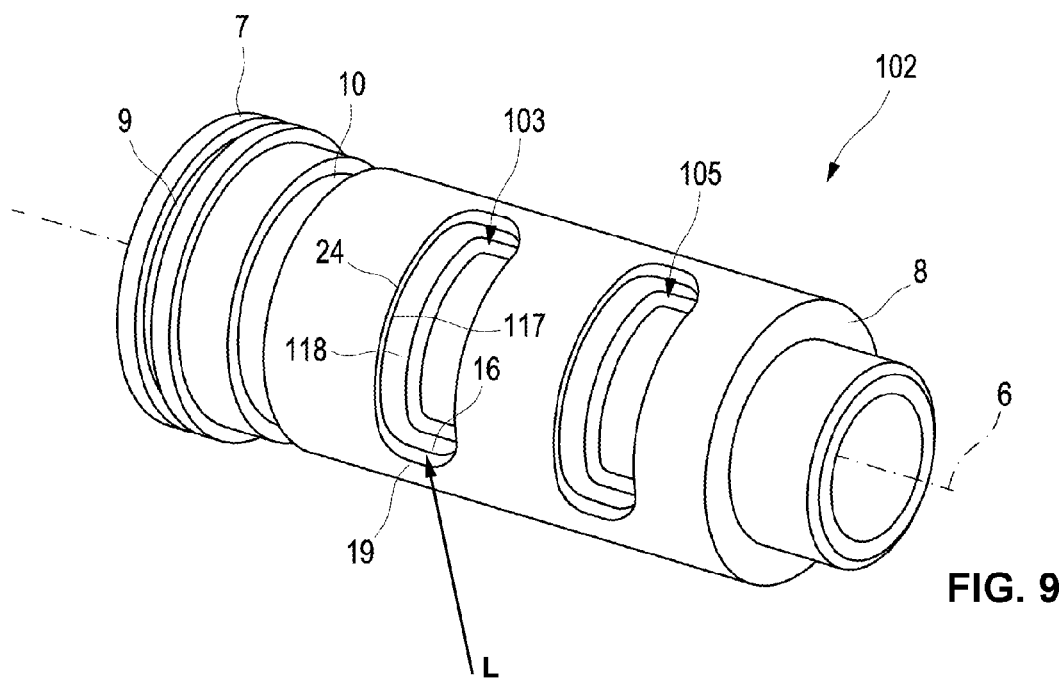
FIG. 9 illustrates a perspective view of the hydraulic bushing without the screen insert of the hydraulic valve according to FIG. 6.

FIG. 9 illustrates the hydraulic bushing 102 of the second embodiment without the screen insert 112. Compared to the hydraulic bushing 2 of the first embodiment an inner edge 117 of the slotted hole 103 is configured with a varying distance from the enveloping surface of the hydraulic bushing 102, wherein a largest distance L is configured in the portion of the receiving groove 16 for receiving the support tongues 22, 23.

Figure 11:
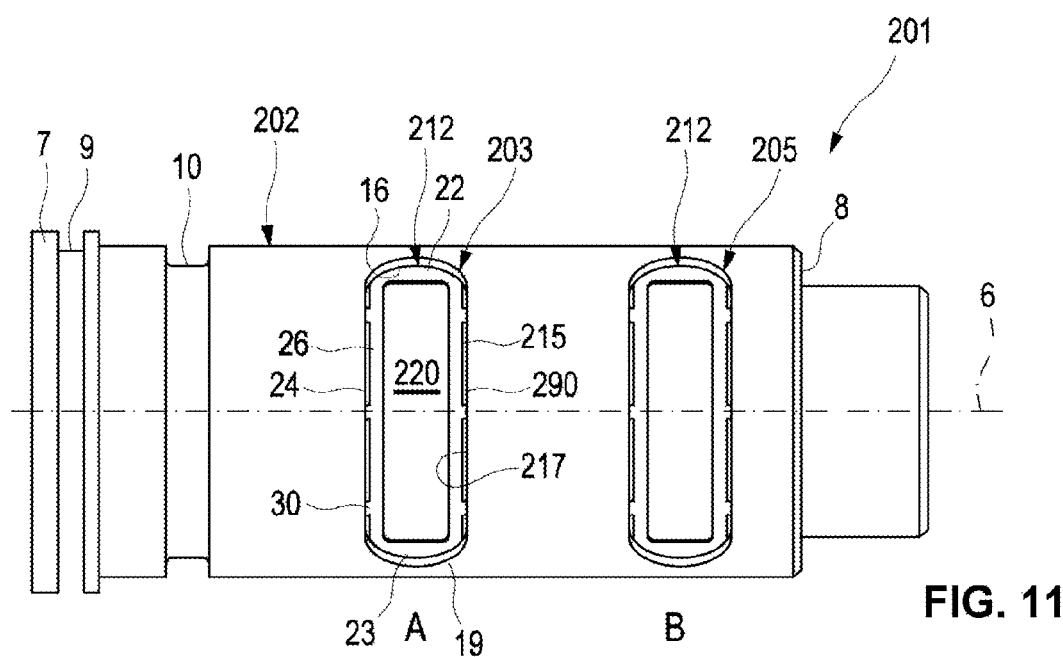
FIG. 11 illustrates a bottom view of the hydraulic bushing of an electromagnetic hydraulic valve in a third embodiment.

FIG. 11 illustrates a third embodiment. The hydraulic element 201 differs primarily through the embodiment of the three identical screen inserts or of the identical slotted holes 203, 204, 205 out of which in turn only one screen insert 212 or one slotted hole 203 is described in more detail.

Figure 12:
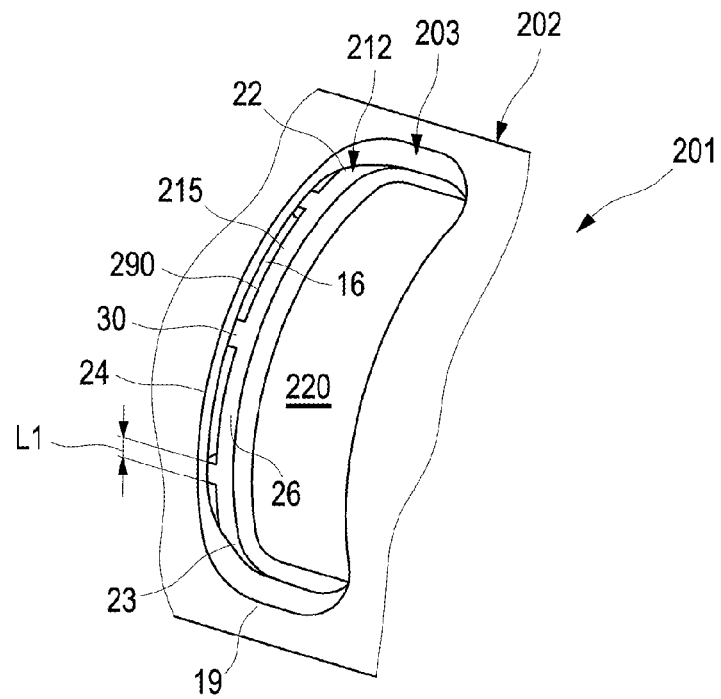
FIG. 12 illustrates a detail view of the screen insert of the hydraulic valve according to FIG. 11.
Figure 13:
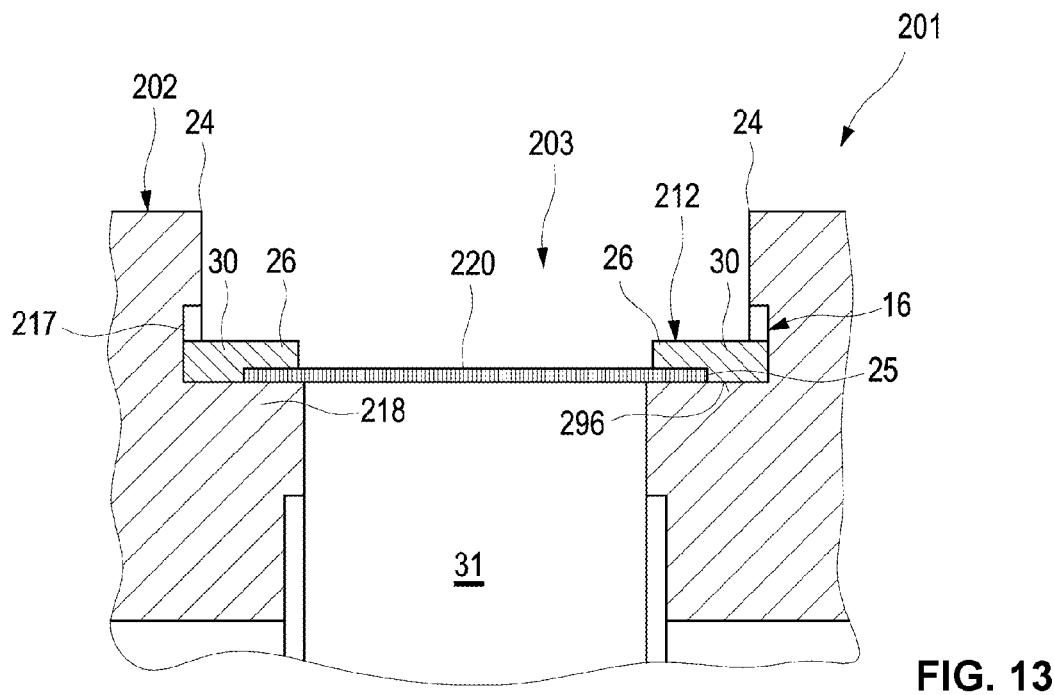
FIG. 13 illustrates a longitudinal sectional view of a detail of the hydraulic bushing in the portion of the screen insert of the hydraulic valve according to FIG. 11.
Figure 14:
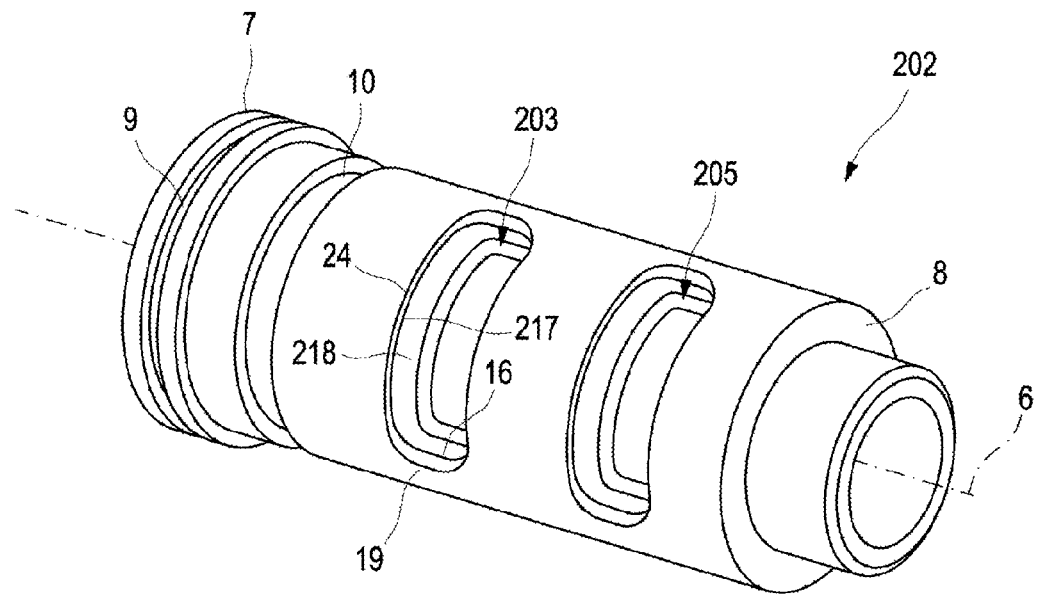
FIG. 14 illustrates a perspective view of the hydraulic bushing without the screen insert of the hydraulic valve according to FIG. 11.
Figure 15:
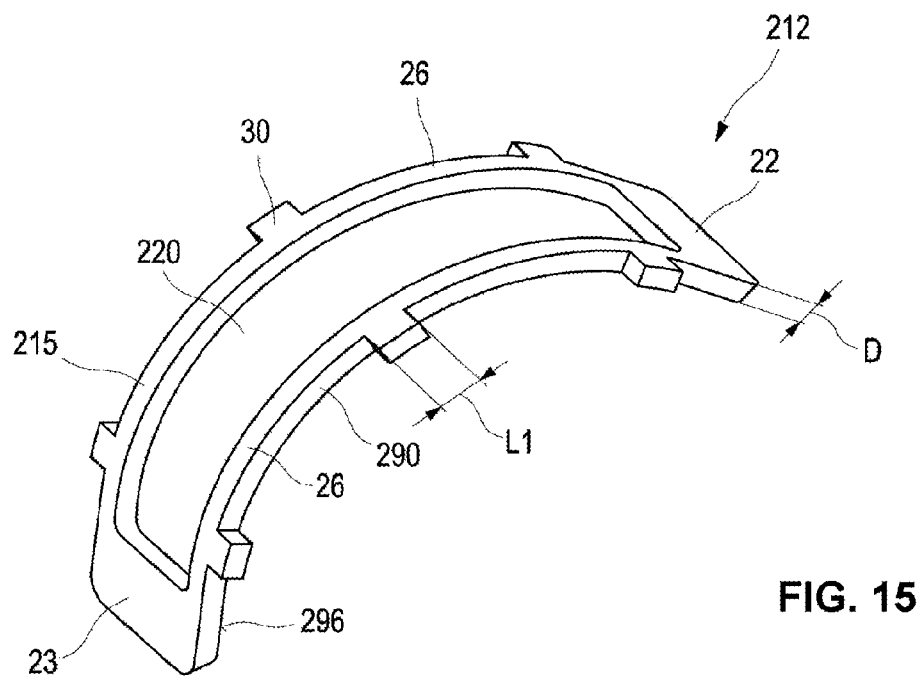
FIG. 15 illustrates a perspective view of the screen insert of the hydraulic valve according to FIG. 11.

The FIGS. 12 and 13 illustrate a perspective view of the screen insert 212 according to the third embodiment. FIG. 13 illustrates the screen insert 212 in a sectional view along the longitudinal axis 6. FIG. 14 illustrates the hydraulic bushing 202 configured for receiving the screen inserts 212 in a perspective view.

The frame 215 of the screen insert 212 also includes clamping lugs 30 at its sides oriented towards the longitudinal sides 24 wherein the clamping lugs are clamped in the receiving groove 16 of the first slotted hole 203 which receiving groove also extends over the entire circumference in this embodiment, wherein the clamping lugs 30 are arranged at an outer edge 290 of the frame 215. The clamping lugs 30 do not completely extend over the circumference of the screen insert 212 in their longitudinal extensions L1 but they only extend along the longitudinal frame sides 26 in sections which suffices for fixation and thus for supporting the screen insert 212 in the hydraulic bushing 202.

The screen insert 212 is arranged resting on the shoulder 218 with a lower surface 296 of the frame 215 and the screen insert 212 is arranged clamped into the receiving groove 16 with the outer edge 290 of the screen insert, wherein a form locking connection between the frame 215 and the receiving groove 16 is formed. The support tongues 22, 23 are received in the respective end portion of the slotted hole 203 for further secured positioning of the screen insert 212 in the first slotted hole 203 in the receiving groove 16 formed therein, wherein the first slotted hole 203 includes the cover tongue 19 which is arranged opposite to the shoulder 218 in these end portions. Thus, the frame 215 is inserted into the receiving groove 16 and contacts the inner edge 217 of the first slotted hole 203 wherein it rests on the shoulder 218 of the first slotted hole 203 and is supported at a cover tongue 219 of the receiving groove 16 which is arranged radially opposite to the shoulder 218.

In all embodiments a thickness D of the support tongues 22, 23 is selected large enough so that a gap 21 formed between the cover tongue 19 and the shoulder 18 or 118 or 218 has a gap height H that is large enough so that the support tongues 22, 23 are fixated through friction locking between the cover tongue and the shoulder 18 or 118 or 218. Another option for fixed positioning of the screen inserts 12, 112, 212 is a deformation of the cover tongue 19 in radial direction for example using a pair of pliers so that the support tongues 22, 23 are clamped between the cover tongue 19 and the shoulder 18 or 118, or 218.

The frame 15, 115, 215 like the screen 20, 120, 220 can be made from metal, in particular steel or aluminum, advantageously corresponding to the material of the hydraulic bushing 2, 102, 202. By the same token the screen insert 12, 112, 212 can be additionally fixated at the respective slotted hole using a bonded connection, in particular a weld.

In case the frame 15, 115, 215 is made from a plastic material a gluing agent is advantageous.

The screen 20, 120, 220 can be a metal fabric as well as a plastic fabric. The plastic fabric has an appropriate grid.

In order to obtain a particularly robust screen 20, 120, 220 it is furthermore advantageous to configure the screen 20, 120, 220 as an etched or stamped thin piece of sheet metal.

The screen 20, 120, 220 made from a piece of sheet metal is more robust compared to a wire or screen fabric so that damages through high volume flows which impact with respective pressure and velocity onto the screen 20, 120, 220 can be excluded. When screen openings are produced through etching they can be illustrated and optimized according to the special functional requirements of the respective valves. Thus, it is for example conceivable to configure the screen openings as apertures so that a temperature independent and controlled pressure drop can be generated when the flow goes through the screen 20, 120, and 220.

In another embodiment that is not illustrated in detail the screen insert 12 includes a screen 20 that is configured integrally in one piece together with the frame 15. The screen 20 configured as a screen fabric has a circumferential edge configured as a frame which is compacted through pressing so that the screen fabric cannot open, this means put differently so that it is not permeable at the edge like in the remaining portion of the screen insert 12. The frame 15 corresponds to this configured edge.

A screen fabric 20 that is compacted at the edge is also designated as full metal screen. The screen insert 12 is inserted into the first slotted hole 3 of the hydraulic bushing 2. Thereafter the edge 15 of the screen insert 12 is directly welded to the hydraulic bushing 2. The material pairing of the hydraulic bushing 2 and the screen insert 12 has to be selected according to welding ability. Identical materials are weldable in particular. For example the hydraulic bushing 2 and also the screen insert 12 can be made from aluminium. The screen insert 12 can be welded on at various circumferential locations at the shoulder 18 in the slotted hole 3, wherein the weld spots are advantageously evenly distributed over a circumference of the edge 15. However, it is also possible to place the weld spots tension optimized or optimized for tightness at the hydraulic bushing 2.

The cartridge valve 200 according to the invention includes a check valve 93, c.f. FIG. 1, which is arranged in the second slotted hole 4 together with the screen insert 12. Put differently irrespective of the different shapes of the screen inserts 12, 112, 212 they can be jointly arranged with a check valve 93 in a respective channel 31, 32, 33.

The described embodiments are purely exemplary. A combination of the described features of different embodiments is also feasible. Additional, in particular non described features of parts of the device associated with the invention can be derived from geometries of the parts of the device that are illustrated in the drawing figures.

REFERENCE NUMERALS AND DESIGNATIONS

1, 101, 201 hydraulic element
2, 102, 202 hydraulic bushing
3, 103, 203 first slotted hole
4, 104, 204 second slotted hole
5, 105, 205 third slotted hole
6 longitudinal axis
7 shoulder
8 housing shoulder
9 ring groove
10 additional ring groove
11 piston
12, 112, 212 screen insert
15, 115, 215 frame
16 receiving groove
17, 117, 217 inner edge
18, 118, 218 shoulder
19 cover tongue
20, 120, 220 thin screen
21 gap
22 first support tongue
23 second support tongue
24 longitudinal side
25 circumferential edge
26 longitudinal frame side
28 recess
30 clamping lug
31 first channel
32 second channel
33 third channel
89, 189, 289 position support bar
90, 190, 290 outer edge
91 inner longitudinal edge
92 recess
93 check valve
96, 196, 296 inside/lower surface
100 actuator
200 cartridge valve
A operating connection
B hydraulic connection
D thickness
H gap height
L largest distance
L1 longitudinal extension (115)
P hydraulic connection

What is claimed is:

1. A cartridge valve, comprising:
a hydraulic bushing including at least one connection Which is configured as a slotted hole extending over a defined portion of a circumference of the hydraulic bushing with respect to a longitudinal axis of the hydraulic bushing and which is protected by a screen insert inserted into the slotted hole,
wherein the slotted hole includes a receiving groove that is configured at least over a portion of a circumference of the slotted hole, wherein the screen insert is arrangeable so that its outer edge is at least partially supported between a shoulder configured in the receiving groove and a cover tongue of the receiving groove,
wherein the slotted hole is cambered with a radius in a plane that is orthogonal to the longitudinal axis of the hydraulic bushing,
wherein the screen insert is cambered according to the radius of the slotted hole and
wherein the cover tongue is arranged opposite to the shoulder.

2. The cartridge valve according to claim 1, wherein the receiving groove is configured in a portion of circumferential ends of the slotted hole.

3. The cartridge valve according to claim 2, wherein the receiving groove is configured as a T-groove.

4. The cartridge valve according to claim 1, wherein the screen insert includes a frame and a screen received in the frame.

5. The cartridge valve according to claim 4, wherein the frame is fixed in the slotted hole.

6. The cartridge valve according to claim 4, wherein the frame respectively includes a support tongue at frame ends that are arrangeable so that they are oriented towards circumferential ends of the slotted hole.

7. The cartridge valve according to claim 4, wherein the screen is configured as an etched or stamped piece of sheet metal.

8. The cartridge valve according to claim 4, wherein the frame is an injection molded plastic component which is injection molded around the screen at an outer edge of the screen.

9. The cartridge valve according to claim 4, wherein at least one position support bar extends from the frame in a radially outward direction.

10. The cartridge valve according to claim 4, wherein at least one clamping lug extends from the frame parallel to the longitudinal axis.

11. The cartridge valve according to claim 4, wherein plural slotted holes that are arranged in an axial sequence with respect to the longitudinal axis of the hydraulic bushing are arranged offset relative to one another over a circumference of the hydraulic bushing.

12. The cartridge valve according to claim 1, wherein the shoulder is provided at longitudinal sides of the slotted hole, wherein the screen insert is placed onto the shoulder.

13. The cartridge valve according to claim 1, wherein the shoulder is circumferentially closed.

14. The cartridge valve according to claim 1,
wherein the slotted hole has a gap height in a plane that is orthogonal to the longitudinal axis of the hydraulic bushing at circumferential ends of the slotted hole,
wherein the gap height is defined between the shoulder configured in the receiving groove and the cover tongue,
wherein a support tongue of the frame is at least partially arranged between the shoulder and the cover tongue, and
wherein a thickness of the support tongue is less than the gap height.

* * * * *